United States Patent [19]
Joeckel

[11] 3,738,256
[45] June 12, 1973

[54] ELECTRIC GRILL TYPE COOKING DEVICE
[75] Inventor: Stanley V. Joeckel, Wayne, N.J.
[73] Assignee: Lincoln Manufacturing Company, Inc., Fort Wayne, Ind.
[22] Filed: May 19, 1972
[21] Appl. No.: 255,065

[52] U.S. Cl. ............... 99/400, 99/446, 99/447, 219/446, 219/460, 219/553
[51] Int. Cl. ............................................. A47j 37/08
[58] Field of Search .................. 219/400, 445, 447, 219/455, 460, 553; 99/331, 385, 389, 400, 401, 446, 447

[56] References Cited
UNITED STATES PATENTS

| | | | |
|---|---|---|---|
| 3,095,495 | 6/1963 | Gvozdjak et al. | 219/446 X |
| 3,350,543 | 10/1967 | Berger et al. | 219/447 |
| 3,225,682 | 12/1965 | Savio | 99/446 |
| 3,301,170 | 1/1967 | Beasley | 99/331 |
| 3,443,063 | 5/1969 | Berger et al. | 219/400 X |
| 3,627,989 | 12/1971 | Heidler | 219/553 |
| 2,864,932 | 12/1958 | Forrer | 99/389 |
| 2,985,097 | 5/1961 | Nevin et al. | 99/447 |
| 3,001,054 | 9/1961 | Fehner | 219/553 X |

Primary Examiner—Volodymyr Y. Mayewsky
Attorney—Albert L. Jeffers and Roger Rickert

[57] ABSTRACT

A cooking device in which a frame which is open at the top has a substantially horizontal grill, or grate, disposed therein upon which articles, including articles of foodstuff, can be placed for heating and cooking. The grate is made up of metal clad electric heating elements shaped like hairpins and in overlapped relation. The entire grate is tiltable upwardly at one end and the frame includes detachable front and back corner pieces at the top overlying the ends of the grate. Beneath the grate is a drip pan and the frame is so constructed that, together with the drip pan, it defines flue passages extending upwardly inside the walls of the frame and then inwardly over the top of the drip pan into the space beneath the grate. All electrical components are sealed in a compartment in the bottom of the frame and on which compartment the drip pan rests.

5 Claims, 7 Drawing Figures

ELECTRIC GRILL TYPE COOKING DEVICE

The present invention relates to cooking devices and is especially concerned with an electric cooking device and, in particular, with a cooking device in which a grill, or grate, is provided which is electrically heated and on which articles to be heated or cooked are placed.

Cooking devices of the general nature with which the present invention is concerned are known and include cooking devices of the type shown in U.S. Pat. Nos. 2,938,102, 3,022,410 and 3,225,682, for example. In the cooking devices according to the prior art, certain defects present themselves. The devices tend to be rather heavy and bulky and are sometimes difficult to clean. Furthermore, the devices in other prior art sometimes become quite hot to touch on the outside walls thereof and may have the electric auxiliaries in such a location that they can deteriorate due to ambient conditions developed by the cooking device.

With the foregoing in mind, a primary objective of the present invention is the provision of a cooking device or grill having a novel type of electrically heated grate therein.

Another object is the provision of a cooking device of the nature referred to in which highly efficient use is made of the metal making up the parts of the cooking device.

Still another object is the provision of a cooking device of the nature referred to in which the outer walls of the cooking device tend to remain cool while simultaneously smoke and fumes developed in the cooking device are carried therefrom.

Still another object of the present invention is the provision of a cooking device of the nature referred to in which portions of the frame in which the grate is mounted are readily detachable to expose the interior of the device for cleaning.

A still further object is the provision of a heating device of the nature referred to in which all of the electrical components are shielded and thus do not tend to deteriorate from ambient conditions.

Still another object of the present invention is the provision of a grate design in which hairpin shaped metal clad resistance heating elements are arranged in a novel manner which provides for improved grate construction and simplifies the electrical interconnections that must be made between individual heating elements.

These and other objects and advantages of the present invention will become more apparent upon reference to the following detailed specification taken in connection with the accompanying drawings in which.

Figure 6:
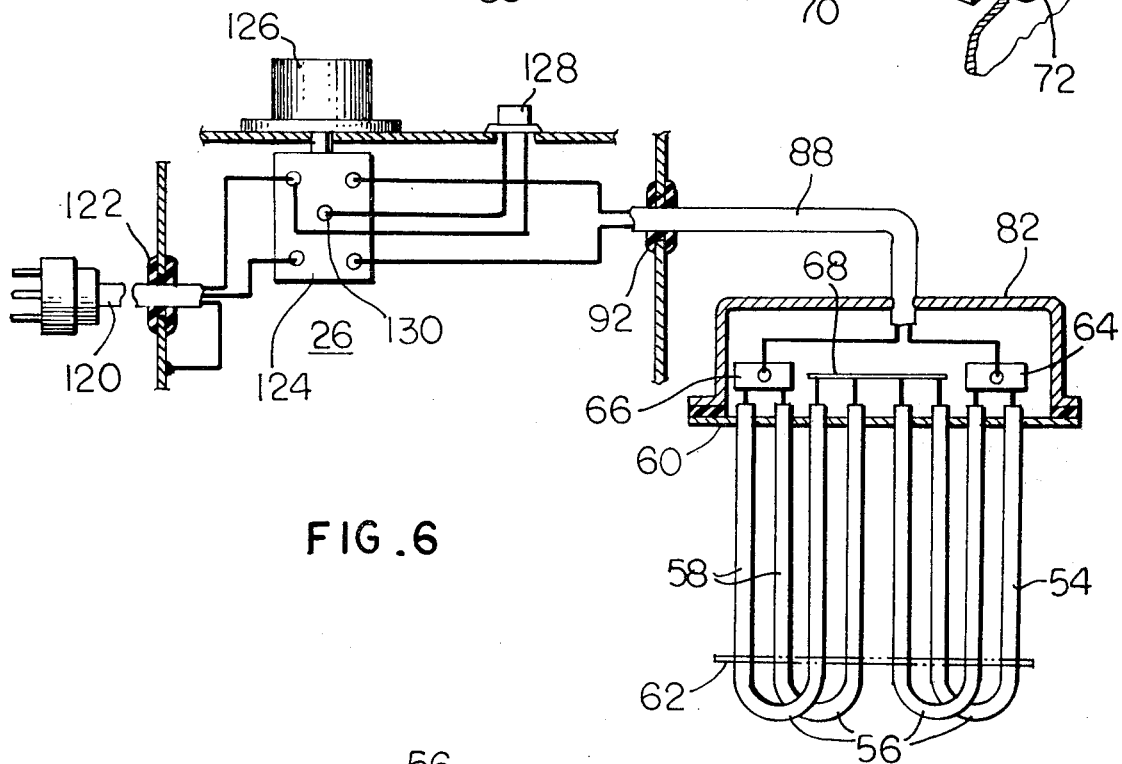

FIG. 6 schematically is a typical circuit diagram for the controlled supply of electrical energy to the heating elements of the grate.

Figure 7:
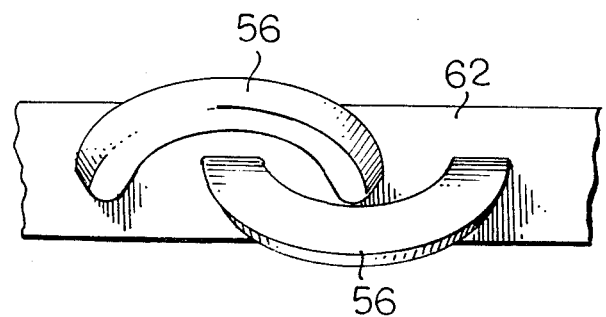

FIG. 7 is a fragmentary end view of a grate section showing the manner in which the bends are formed to permit overlapping of the heating elements.

BRIEF SUMMARY OF THE INVENTION

According to the present invention, a cooking device is provided consisting of a substantially rectangular frame open at the top and having disposed in the top a grill, or grate, formed of multiples of hairpin shaped metal clad electric heaters. The heaters are placed close enough together in the grate, or grill, to support food placed thereon while being spaced apart to allow grease and the like to pass downwardly therethrough.

A drip tray removably mounted in the frame beneath the grate is provided to catch drippings and covers substantially the entire areas of the grate. The individual reaches of the electric heaters making up the grate are preferably flattened on top so that the grate has a substantially planar upper surface intersected by the gaps between adjacent reaches of the heating elements.

Articles to be cooked can be placed directly on the grate and will be heated by conductivity and also by radiation from the grate while the grate also lends itself to receiving containers which are to be heated.

The hairpin type metal clad electric heaters making up the grate are interconnected in groups and individual controls are provided for the respective groups so that as many of the groups of electric heaters as desired can be energized at one time.

The frame of the unit is formed of sheet metal, preferably stainless steel, and is generally divided into a lower compartment which contains electrical components and an upper compartment at the top of which is the aforementioned grate and in the bottom of which is the aforementioned drip pan. The controls for controlling the supply of energy to the electric heaters making up the grate are mounted on a front panel of the frame beneath the opening for the drip pan so that the only exposed electrical components inside the frame are cables leading from the lower compartment referred to up to the electric heating elements.

The grill, or grate, made up of the electric heating elements is pivoted in the frame at one end so that it can be tilted upwardly to expose the underneath side of the grate and the inside of the frame for cleaning. The frame includes angular cover members extending across the front and back corners at the top and extending over the top and end parts of the grate. These cover members can be snapped off to permit the grate to be tilted upwardly for cleaning purposes.

The hairpin shaped electric heating elements are formed with the closed ends bent out of the plane of the legs to permit the elements to be nested together.

DETAILED DESCRIPTION OF THE INVENTION

Figure 1:
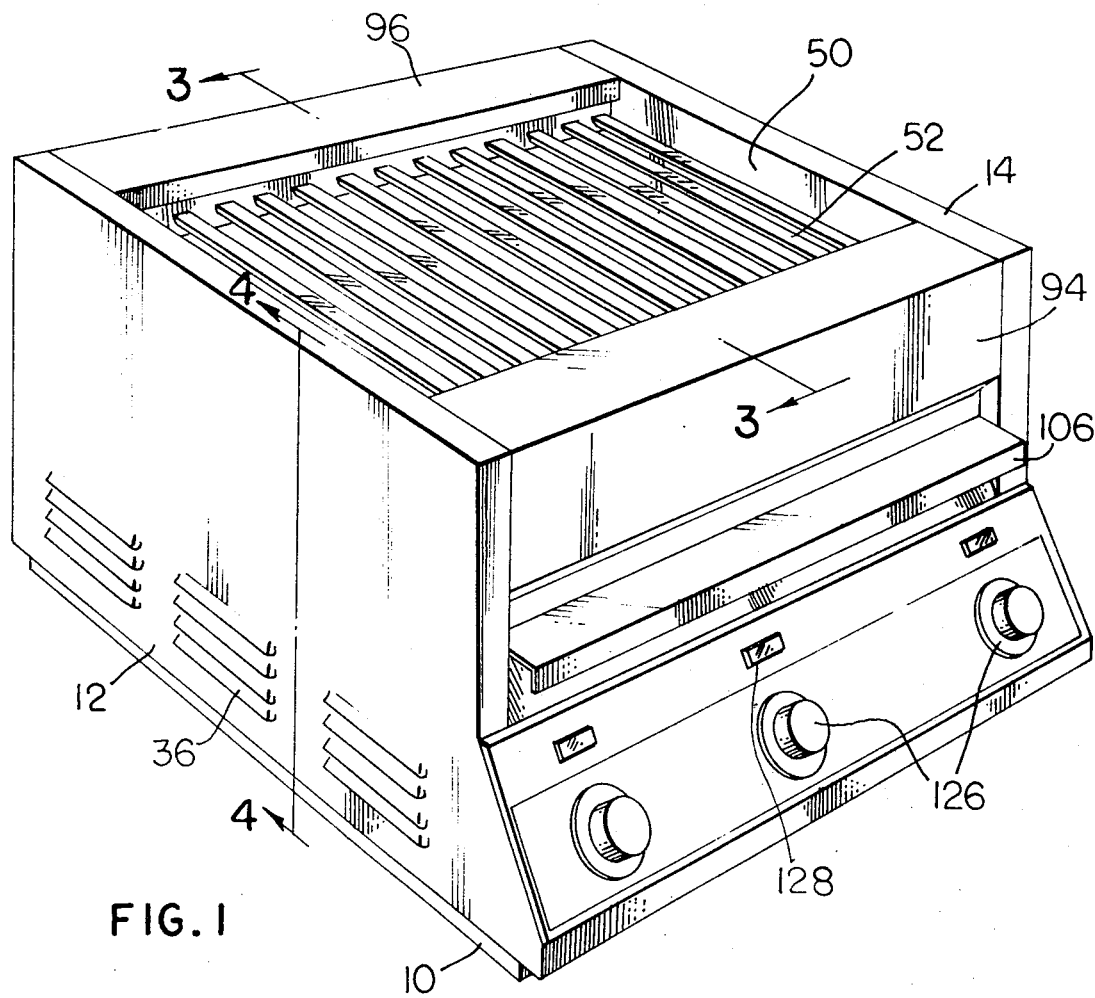
FIG. 1 is a perspective view showing a cooking device according to the present invention.
Figure 3:
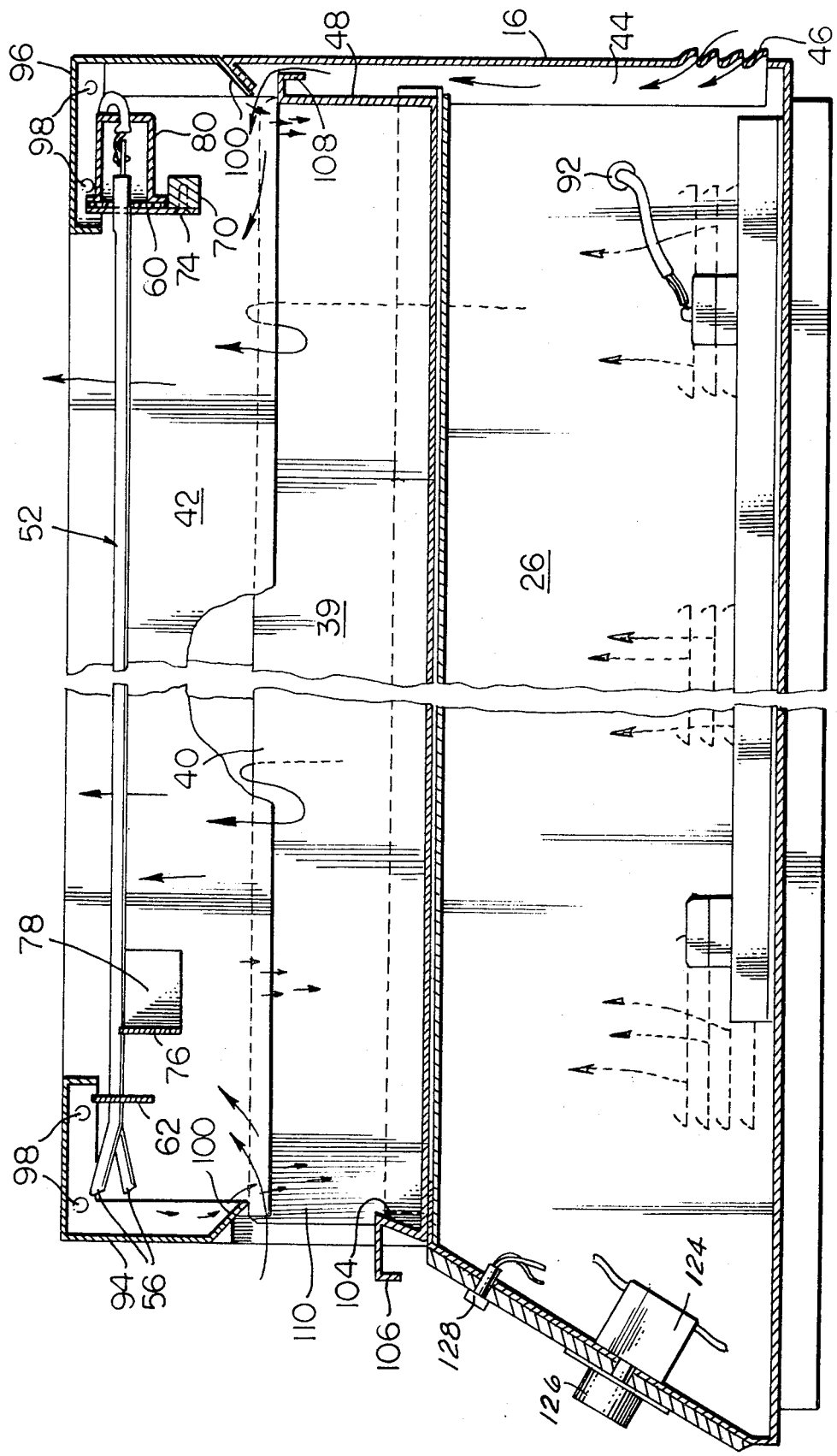
FIG. 3 is a longitudinal vertical sectional view indicated by line 3—3 on FIG. 1 and drawn at enlarged scale.
Figure 4:
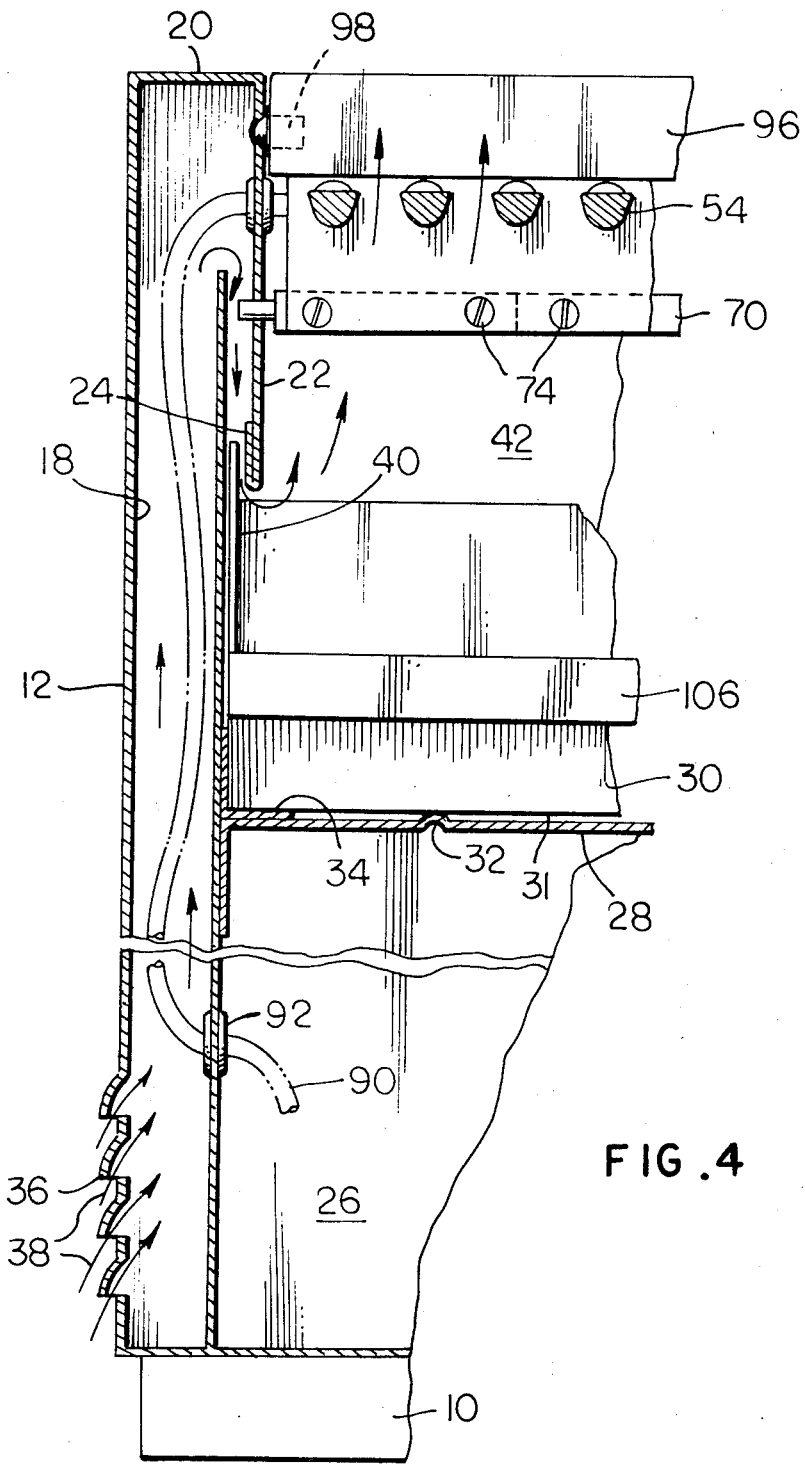
FIG. 4 is a fragmentary vertical sectional view indicated by line 4—4 on FIG. 1 and drawn at enlarged scale.

Referring to the drawings somewhat more in detail, the cooking device shown in FIG. 1 and illustrated in longitudinal section in FIG. 3 and in partial vertical section in FIG. 4, comprises a frame having a base portion 10 which will support the cooking device on a counter top or other suitable location. Upstanding from the base 10 are side wall members 12 and 14 and a back wall member 16, the said walls being interconnected to form a substantially rigid unit.

As will be seen in FIG. 4, which shows side wall member 12, each side wall member has an outer wall portion 18 extending substantially the full height of the device, a horizontal portion 20 at the top and a dependent inner wall portion 22 extending downwardly from the inner end of horizontal portion 20. Dependent inner portion 22 extends substantially the full length of the frame of the device in the fore and aft direction on each side and may have the lower edge there turned upwardly as at 24 to add stiffness to the structure and also to eliminate any sharp edges.

The frame of the device is formed with a lower compartment 26 having front, back, side, top and bottom walls and within which electric auxiliaries pertaining to the device are mounted. The top wall 28 of lower compartment 26 is the wall on which drip pan 30 rests and, to this end, top wall 28 may be provided with longitudinally extending upwardly formed ribs 32 which are slidably engaged by the bottom wall 31 of the drip pan.

Advantageously, fore and aft angle members 34 are provided on compartment 26 at the side edges of the drip tray at the bottom and guide the drip tray in the fore and aft direction. The angles may be connected to the side and back walls of the frame of the device thereby to add rigidity to the frame structure.

It will be noted that the lower edges of inner wall portions 22 are disposed inside and at a lower level than the upper edges of side walls 40 of drip pan 30 and that there is a slit therebetween for air flow for a purpose to be described hereinafter.

As will best be seen in FIG. 4, the outer wall portions 18 of the side wall members are louvered near the bottom as at 36 so that air can flow therein as indicated by arrows 38 and which air will then pass vertically upwardly in the flue space between outer wall portions 18 and the side walls of lower compartment 26 and along the outside of the drip pan 30 to the upper edges of the side walls 40 thereof and then downwardly between the side walls 40 and under the lower edges of the inner wall portions 22 and into the space 42 of the upper part of the frame and beneath the grate of the device.

There is a flue space of the aforementioned type on each side of the device and a further flue space 44 inside the back wall member 16 of the device to which air is supplied by louvers 46 at the bottom of the back wall member. The air flows upwardly inside back wall member 16 and past back wall 48 of the drip pan and over the back edge thereof into the aforementioned space 42.

The side and back walls of the drip pan thus form a part of the flue passages referred to thereby eliminating the need for further frame members to form the flue passages.

The supply of air through the aforementioned flue passages keeps the outer wall areas of the device cool and provides air to the space beneath the grate which will flow upwardly through the grate and carry off smoke and vapors developed at the grate to a vent system disposed above the device according to conventional practices.

Figure 2:
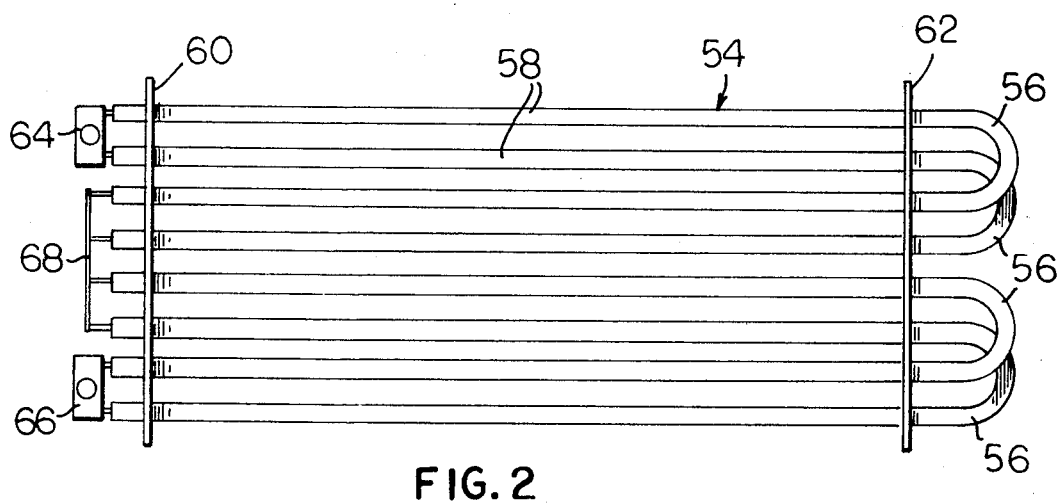
FIG. 2 is a plan view looking down on a typical portion of the electrically heated grate mounted in a horizontal plane at the top of the cooking device.

Between the upper portions of the side wall members of the device is an opening 50 in which is disposed a grate 52 according to the present invention. Grate 52 comprises a plurality of hairpin shaped heating elements 54 arranged as shown in FIG. 2. Each of the hairpin shaped heating elements has legs joined at the one end by an arcuate portion 56 while at the other end the legs terminate in terminals.

As shown in FIG. 2, a typical group of heating elements might consist of four thereof so that the grate section formed thereby consists of eight linear portions 58 in spaced relation connected by the arcuate portions 56 and with each heating element overlapping the one adjacent thereto on one side. Plates 60 and 62 disposed near the ends of the heating elements fixedly interconnect the heating elements to form a substantially rigid unit. Plate 60 is sealingly fixed to the metal sheathing of the heating elements in any desired manner.

Advantageously, the heating elements are of the type in which the greatest heat is developed between plates 60 and 62 with a reduced amount of heat being developed in the arcuate portions 56 thereof for more efficient operation of the grate. In making up the novel grate unit arrangement of FIG. 2, all of the straight portions 58 of the heating elements lie in one and the same plane and in order to permit the arcuate sections 56 to overlap, as illustrated, one thereof is bent upwardly and the other is bent downwardly. The compound curve resulting in the closed end of each heating element is readily formed therein.

The arrangement of the heating elements, as shown in FIG. 6, has a particular advantage in connection with making electrical connections thereto. Usually, each heating element is designed to operate at a certain standard voltage and the heating elements arranged as shown in FIG. 2 offer the advantage that the heating elements can be connected in series parallel relation in a simple manner and provided with a respective control and a grill section will, thus, be formed which can be heated uniformly and readily controlled.

As illustrated, a supply line can be connected to points 64 and 66 and the opposite ends of the heating elements connected to the said points can readily be ganged together by a simple connector as indicated at 68. The novel arrangement of the heating elements to make up a grate section according to the present invention thus substantially simplifies the problems of making electrical connections thereto and permits connections to be made in such a manner that deterioration thereof is substantially eliminated.

Figure 5:
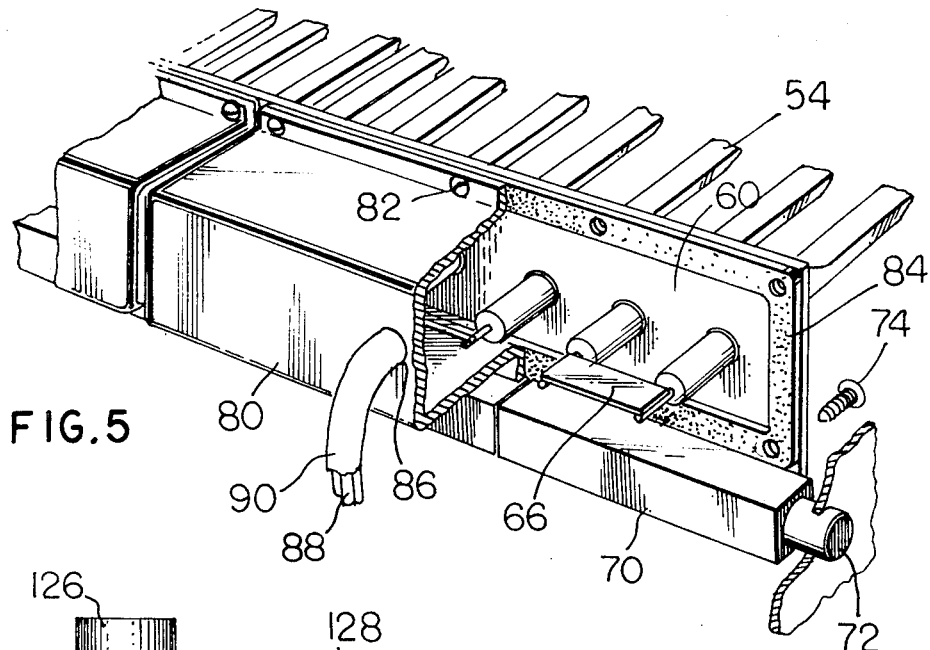
FIG. 5 is a fragmentary perspective view showing details in connection with the mounting of the heating elements in the device to make up the grate.

The grate 52 made up of groups of heating elements, each formed as shown in FIG. 2, is mounted in the frame of the device as shown in FIGS. 3, 4 and 5. Each of the aforementioned plates 60 at its lower edge is adapted to engage a bar 70 which is rectangular in cross section except for the extreme end parts thereof and which are rounded to form pivot portions 72 that are receivable in the inner side wall portions 22 of the side wall members as shown in FIG. 4.

The plates 60 are secured to the bar 70 as by screws 74 and this arrangement permits the entire grate to be tilted upwardly about the axis of the pivot portions 72 of bar 70 to expose the interior of the device and the underside of the grate. Near the opposite end of the grate, a transverse plate 76 having turned back ends 78 secured to inner side wall portions 22 of the side wall members provides a stop on which the grate rests in its lowered position.

The exposed ends of the heating elements where connections are made thereto are enclosed within a box 80 which is attached to the respective plate 60 by screws 82 with an intervening sealing gasket 84 which may consist, for example, of a silicone material or some other material that will withstand the temperatures encountered in the device.

Each of the covers 80 is provided with an aperture 86 through which a cable 88 leads for connection to the heating elements pertaining to the cover and each cable 88 is preferably provided with a protective shield 90 which is sealed in the respective aperture 86. Each cable leads from the respective cover 80 downwardly inside the frame and through a respective sealing grommet 92 into the aforementioned lower compartment 26 for connection to the electric auxiliaries therein.

The frame comprises an upper front corner piece 94 and an upper rear corner piece 96 which, as will be seen in FIG. 3, extend about the respective ends of the grate 52. Each of these corner members comprises spring plungers 98 mounted in the opposite ends thereof by means of which the corners are releasably connected to the frame of the device. Spring clips or a single hinge pin on each side (not shown) can be used in place of the spring plunger 98, if so desired. The lower ends of the vertical legs of the corner pieces are bent off inwardly as indicated at 100 to direct any spatter or drippings from the grill that get on the inside of the corner pieces down into the drip pan.

As will be seen in FIG. 1, the corner pieces enclose the ends of the grate and provide the frame of the device with a smooth contour which is easily kept clean but at the same time can readily be snapped out of, or hinged away from, the frame to expose the grate for being tilted upwardly to expose the bottom thereof and the inside of the frame for cleaning.

The aforementioned drip pan 30 in addition to the aforementioned side walls 40 thereof and back wall 48 and bottom wall 31 includes a front wall 104 which is advantageously formed outwardly and downwardly to form a hook-like handle 106 for manipulation of the drip pan. The back wall 48 is also advantageously provided with a hook-like rear handle 108. The front wall of the drip pan leaves an opening 110 in the front wall of the device through which air can pass into space 42 thereby to sweep smoke and vapors out of the space beneath the grate.

FIG. 6 schematically illustrates a wiring diagram pertaining to a grate section. In FIG. 6, 120 is a power cable leading through a grommet 122 in a wall of compartment 26 and having the ground wire thereof connected to the frame of the device and the power wires thereof connected to terminals of a controller 124 which also has terminals connected to the cable 88 leading to the heating elements of the respective grate unit.

The controller 124 has an ON-OFF and adjusting knob 126 which, as will be seen in FIGS. 1 and 3, is carried by the inclined front wall of the lower compartment 26 which also forms the front wall of the frame of the device. There is a control knob 126 for each grate section so that the device illustrated in FIG. 1 will be seen to be made up of three grate sections which can be selectively energized and controlled.

Adjacent each controlled knob is a signal light 128 having one side connected to one of the power lines leading into the device and the other side connected to a terminal 130 on the respective controller which is energized whenever the respective control knob is turned to ON position.

Each lamp 128 remains illuminated as long as the control knob is on ON position, whether or not there is a supply of energization to the respective grate section so that the signal lights do not blink on and off as the supply of power to the respective grate section is initiated and interrupted by the thermostatic control device in the pertaining control unit. A dual function single light (not shown) can be substituted for the light 128 to provide indication that the main power source is on and that energy is being cycled to the heater by means of the controller 124.

FIG. 7 is a fragmentary end view of a grate section and shows how the closed bends 56 at the one ends of the legs of the respective unit appear in end view and are so formed that the legs of the overlapped heating elements are in coplanar relation while the heating elements themselves are physically separated from each other.

Modifications may be made within the scope of the appended claims.

What is claimed is:

1. In an electric grill type cooking device having an electrified grate for heating articles of food stuff supported thereon in direct contact therewith; a frame open at the top and including means for supporting the electrified grate in a horizontal position near the top thereof, the frame having an opening to supply air to the space in the frame directly beneath the grate; and a drip pan removably supported in the frame beneath the grate: the improvement comprising a plurality of hairpin shaped electric heating elements having legs with a bend interconnecting the legs at one end and with terminals at the free ends of said legs, said heating elements being arranged in overlapping relation with the legs being coplanar and with at least one leg of each of the heating elements being disposed between the legs of another of the said heating elements, all of the free ends of said legs being at the same end of the grate and some of the said heating elements at the end having the said bend being bent out of the plane of the legs thereof to permit said heating elements to be arranged in overlapping relation with the legs thereof coplanar; and electrical conductors for supplying electrical energy to the electric heating elements.

2. The improvement of claim 1 wherein the legs of said heating elements are spaced sufficiently close to one another to support articles of food placed thereon.

3. The improvement of claim 1 wherein the bend interconnecting the legs is of a generally semicircular configuration.

4. The improvement of claim 1 wherein said legs in the region thereof between the ends thereof are formed flat on the side facing upwardly when the grate is in operative horizontal position and the heating elements are overlapped in pairs with the end having the said bend being bent upwardly on one heating element of a pair and the end having the said bend being bent downwardly on the other heating element of the pair.

5. The improvement of claim 1 further comprising at least one plate extending at right angles to said legs near the end having said bend and fixed thereto to combine a plurality of said heating elements into a unit.

* * * * *